US010023146B2

(12) United States Patent
Faruque et al.

(10) Patent No.: US 10,023,146 B2
(45) Date of Patent: Jul. 17, 2018

(54) VEHICLE SEAT ASSEMBLY INCLUDING AIRBAG

(71) Applicant: Ford Global Technologies, LLC, Dearborn, MI (US)

(72) Inventors: Mohammed Omar Faruque, Ann Arbor, MI (US); Dean M. Jaradi, Macomb, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/348,201

(22) Filed: Nov. 10, 2016

(65) Prior Publication Data

US 2018/0126941 A1    May 10, 2018

(51) Int. Cl.
*B60R 21/207*    (2006.01)
*B60R 21/2338*    (2011.01)
(Continued)

(52) U.S. Cl.
CPC .......... *B60R 21/207* (2013.01); *B60R 21/233* (2013.01); *B60R 21/235* (2013.01);
(Continued)

(58) Field of Classification Search
CPC ........... B60R 2021/23308; B60R 2021/23332; B60R 21/207; B60R 21/233
See application file for complete search history.

(56) References Cited

U.S. PATENT DOCUMENTS 5,575,497 A    11/1996  Suyama et al.
5,577,765 A *  11/1996  Takeda ................. B60R 21/233
                                                        280/729
(Continued)

FOREIGN PATENT DOCUMENTS

DE        4019596 A1    1/1992
DE      19600278 C1     1/1997
(Continued)

OTHER PUBLICATIONS

Search Report from United Kingdom Intellectual Property Office dated Apr. 13, 2018 regarding Application No. GB1718406.0 (5 pages).

*Primary Examiner* — Nicole T Verley
(74) *Attorney, Agent, or Firm* — Frank A. MacKenzie; Bejin Bieneman PLC

(57) ABSTRACT

A seat assembly for a vehicle includes a seatback and a seat bottom extending away from the seatback. An airbag is supported by the seat bottom and includes a middle member having a first end and a second end. The middle member is spaced from the seatback. The airbag includes a first side member extending from the first end of the middle member toward the seatback, and a second side member extending from the second end of the middle member toward the seatback. When inflated in response to a sensed impact of the vehicle, the middle member, the first side member, and the second side member extend around the occupant. One leg of the occupant is disposed between the middle member and the first side member, and the other leg of the occupant is disposed between the middle member and the second side member.

20 Claims, 7 Drawing Sheets

(51) Int. Cl.
 *B60R 21/233* (2006.01)
 *B60R 21/235* (2006.01)
 *B60R 21/237* (2006.01)

(52) U.S. Cl.
 CPC ........ *B60R 21/237* (2013.01); *B60R 21/2338* (2013.01); *B60R 2021/23509* (2013.01)

(56) References Cited

U.S. PATENT DOCUMENTS

| | | | |
|---|---|---|---|
| 9,738,243 B2 * | 8/2017 | Fukawatase | B60R 21/233 |
| 2009/0236832 A1 * | 9/2009 | Ilda | B60R 21/213 |
| | | | 280/730.1 |
| 2009/0295131 A1 | 12/2009 | Kim | |
| 2014/0300088 A1 | 10/2014 | Fukawatase | |
| 2016/0082915 A1 | 3/2016 | Madaras | |
| 2016/0121839 A1 * | 5/2016 | Ko | B60R 21/233 |
| | | | 280/730.1 |
| 2017/0021794 A1 * | 1/2017 | Sumiya | B60R 21/233 |
| 2017/0203711 A1 * | 7/2017 | Ohno | B60R 21/203 |

FOREIGN PATENT DOCUMENTS

| | | | | |
|---|---|---|---|---|
| DE | 19834061 A1 | * | 2/2000 | ........... B60N 2/4876 |
| DE | 102013015312 A1 | * | 3/2015 | ........... B60R 21/207 |
| EP | 1569825 B1 | | 11/2003 | |
| JP | H081982 Y2 | | 1/1996 | |
| JP | 2007099170 A | * | 4/2007 | ........... B60R 21/207 |
| JP | 2007230395 A | * | 9/2007 | ........... B60R 21/207 |
| JP | 2008265660 A | | 11/2008 | |
| JP | 2009029182 A | | 2/2009 | |
| JP | 2013159220 A | | 8/2013 | |
| KR | 20110046010 A | | 5/2011 | |
| WO | WO 200021797 A1 | | 4/2000 | |
| WO | WO-2008038523 A1 | * | 4/2008 | ........... B60R 21/207 |
| WO | 2011110982 A1 | | 9/2011 | |
| WO | 2015036527 A1 | | 3/2015 | |

\* cited by examiner

VEHICLE SEAT ASSEMBLY INCLUDING AIRBAG

BACKGROUND

Vehicles may include a variety of airbag assemblies deployable during vehicle impacts to absorb energy from occupants of the vehicles during the impact. A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. There remains an opportunity to design vehicle components, including airbags, that take into account the reduced operation monitoring provided by the autonomous vehicle.

DETAILED DESCRIPTION

Figure 1:
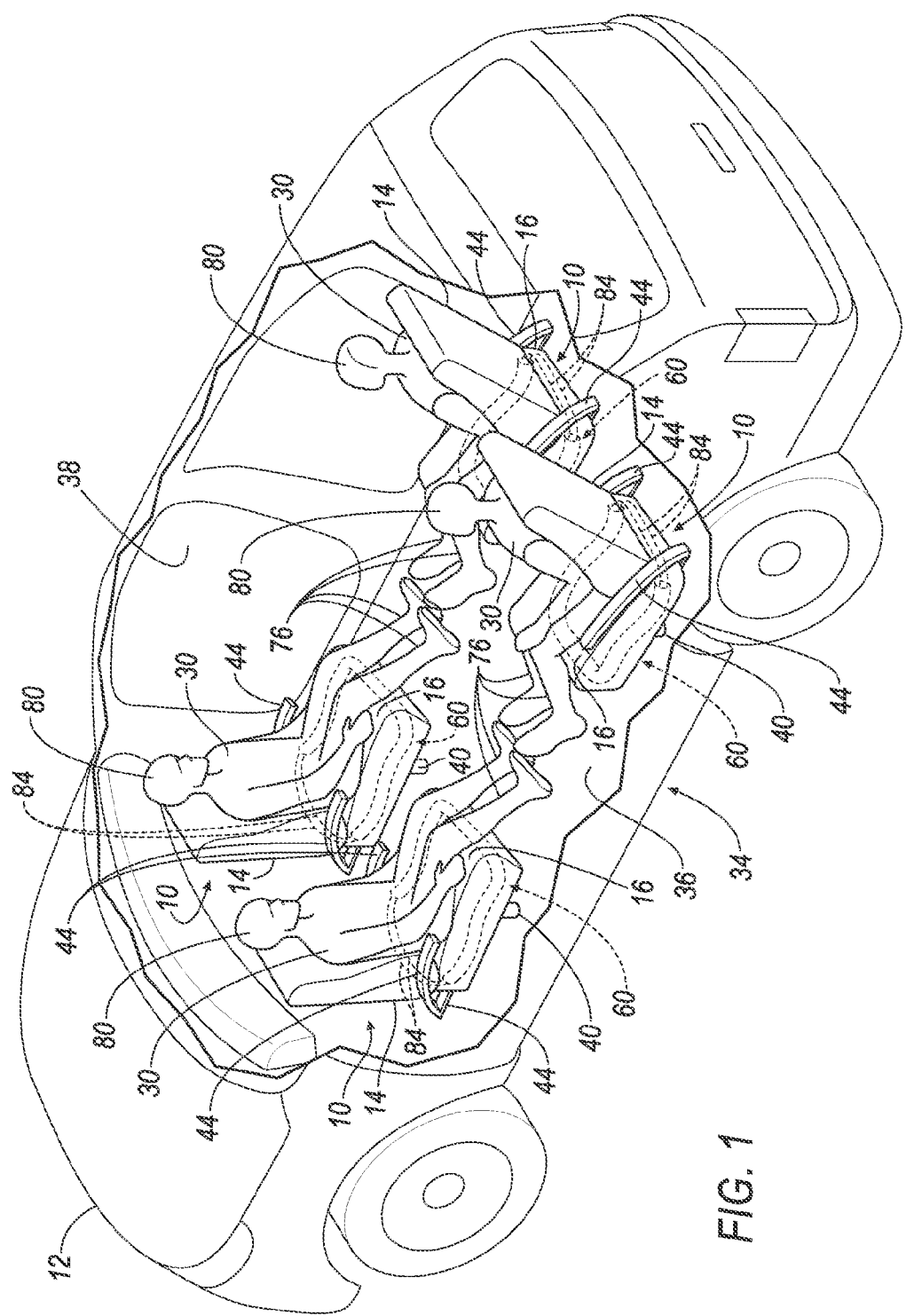
FIG. 1 is a perspective view and partially cut-away view of a vehicle including a first embodiment of seat assemblies each including an airbag in an uninflated position.

With reference to the Figures, wherein like numerals indicate like parts throughout the several views, a seat assembly 10, 100 for a vehicle 12 includes a seatback 14 and a seat bottom 16 extending away from the seatback 14. An airbag 18 is supported by the seat bottom 16 and includes a middle member 20, i.e., a front member 20, having a first end 22 and a second end 24. The middle member 20 is spaced from the seatback 14. The airbag 18 includes a first side member 26 extending from the first end 22 toward the seatback 14, and a second side member 28 extending from the second end 24 toward the seatback 14.

Figure 2:
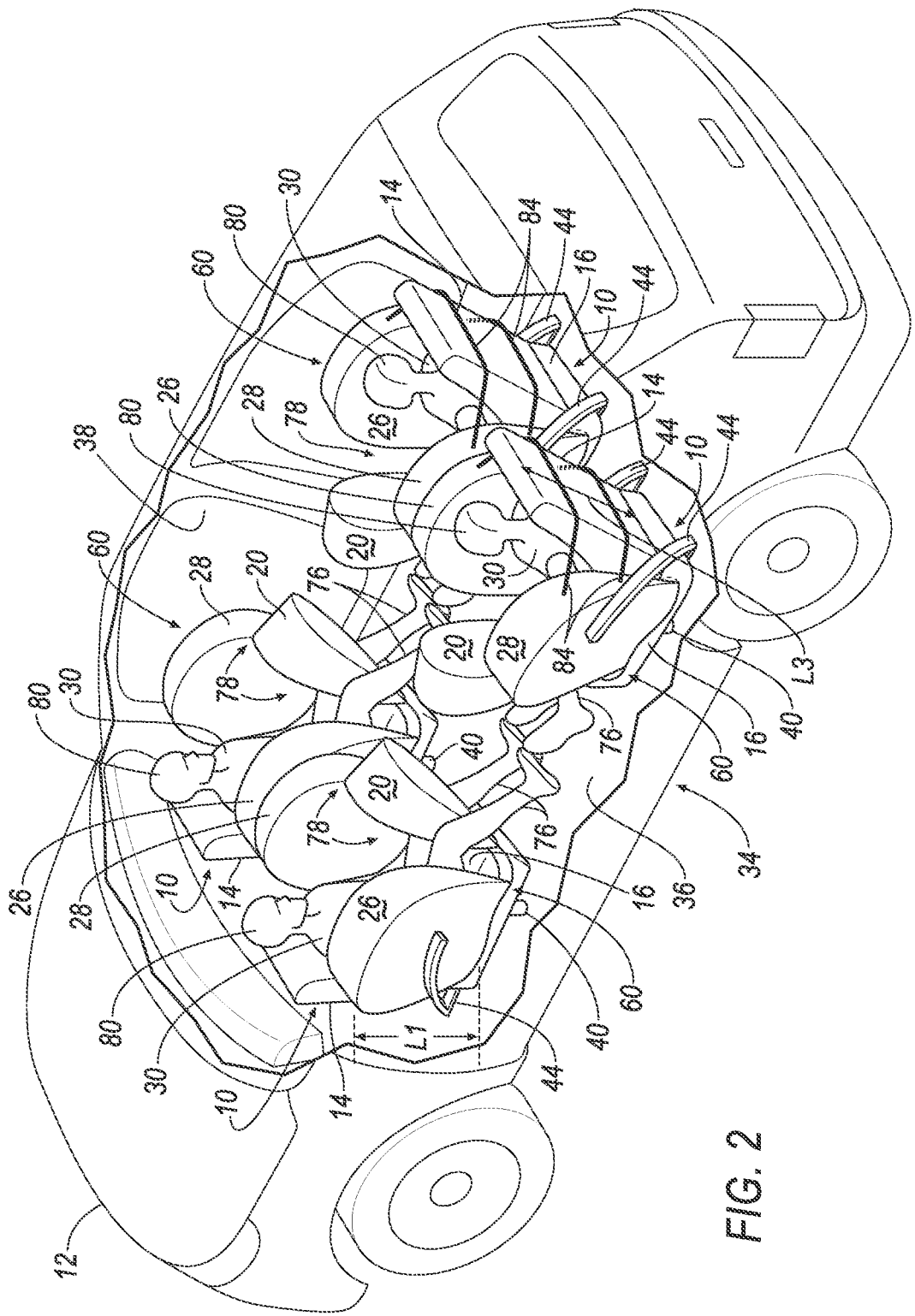
FIG. 2 is the perspective view of FIG. 1 with the airbags in an inflated position during an impact of the vehicle.
Figure 5:
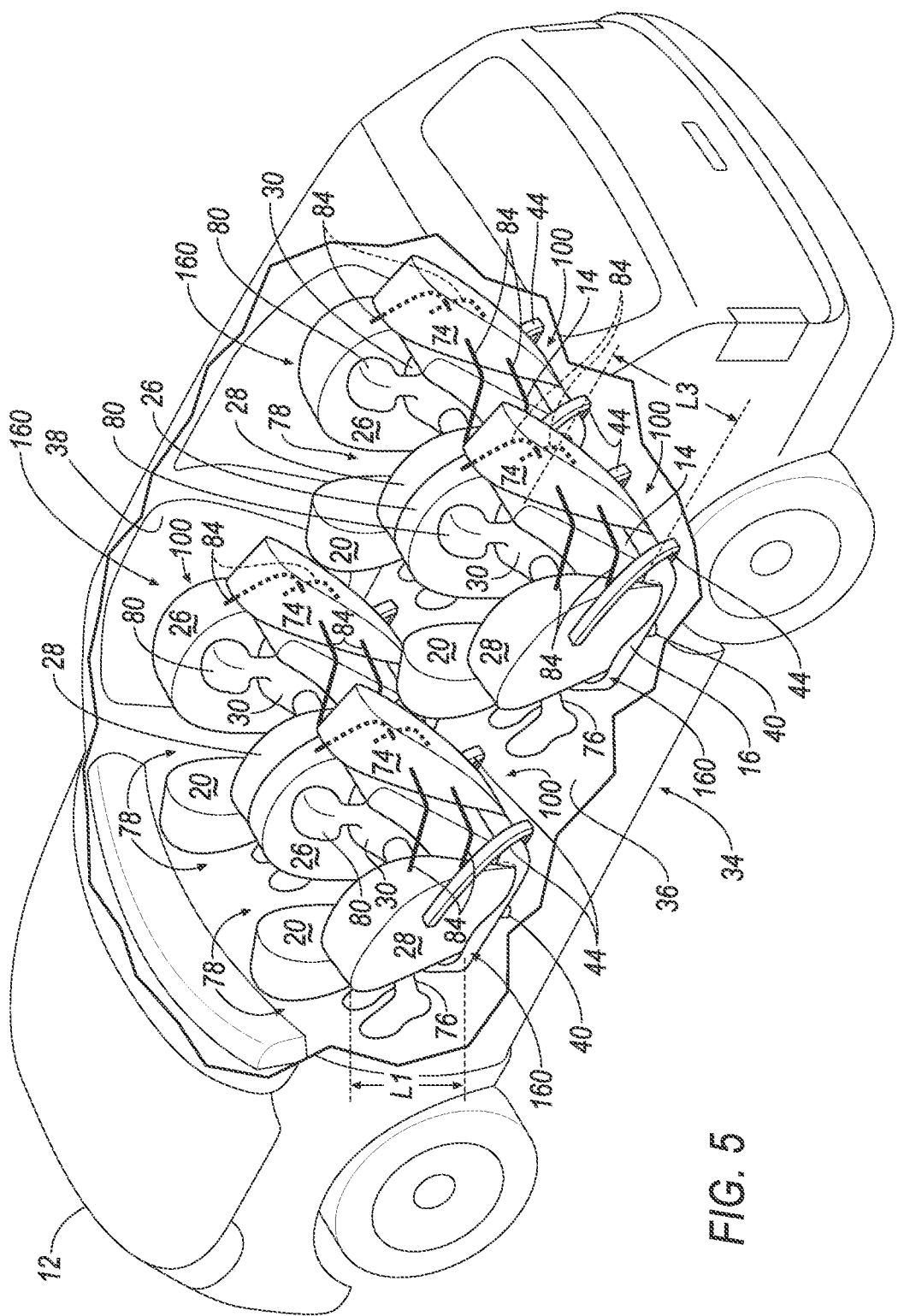
FIG. 5 is a perspective view and partially cut-away view of a vehicle including a second embodiment of seat assemblies each including an airbag in an inflated position during an impact of the vehicle.

During a sensed impact of the vehicle 12, the airbag 18 may be inflated from an uninflated position, as shown in FIG. 1, to an inflated position, as shown in FIGS. 2 and 5, to assist in cushioning an occupant 30 seated in the seat assembly 10, 100. In particular, when an impact is sensed, the airbag 18 may deploy causing the middle member 20, the first side member 26 and the second side member 28 of the airbag 18 to inflate. Specifically, the middle member 20 extends upwardly between the legs 76 of the occupant 30, and the first side member 26 and the second side member 28 inflate upwardly on opposite sides of the occupant 30. One leg 76 of the occupant 30 is disposed between the first side member 26 and the middle member 20, and the other leg 76 of the occupant is disposed between the second side member 28 and the middle member 20. When the airbag 18 is inflated, the occupant 30 is generally surrounded by the seatback 14, the first side member 26, the second side member 28, and the middle member 20 to support the occupant 30 in omnidirectional impacts of the vehicle 12. Additionally, the airbag 18 in the inflated position may reduce the likelihood of occupants 30 impacting each other during an impact of the vehicle 12, and the airbags 18 may act as reaction surfaces for each other during an impact of the vehicle 12.

Figure 6:
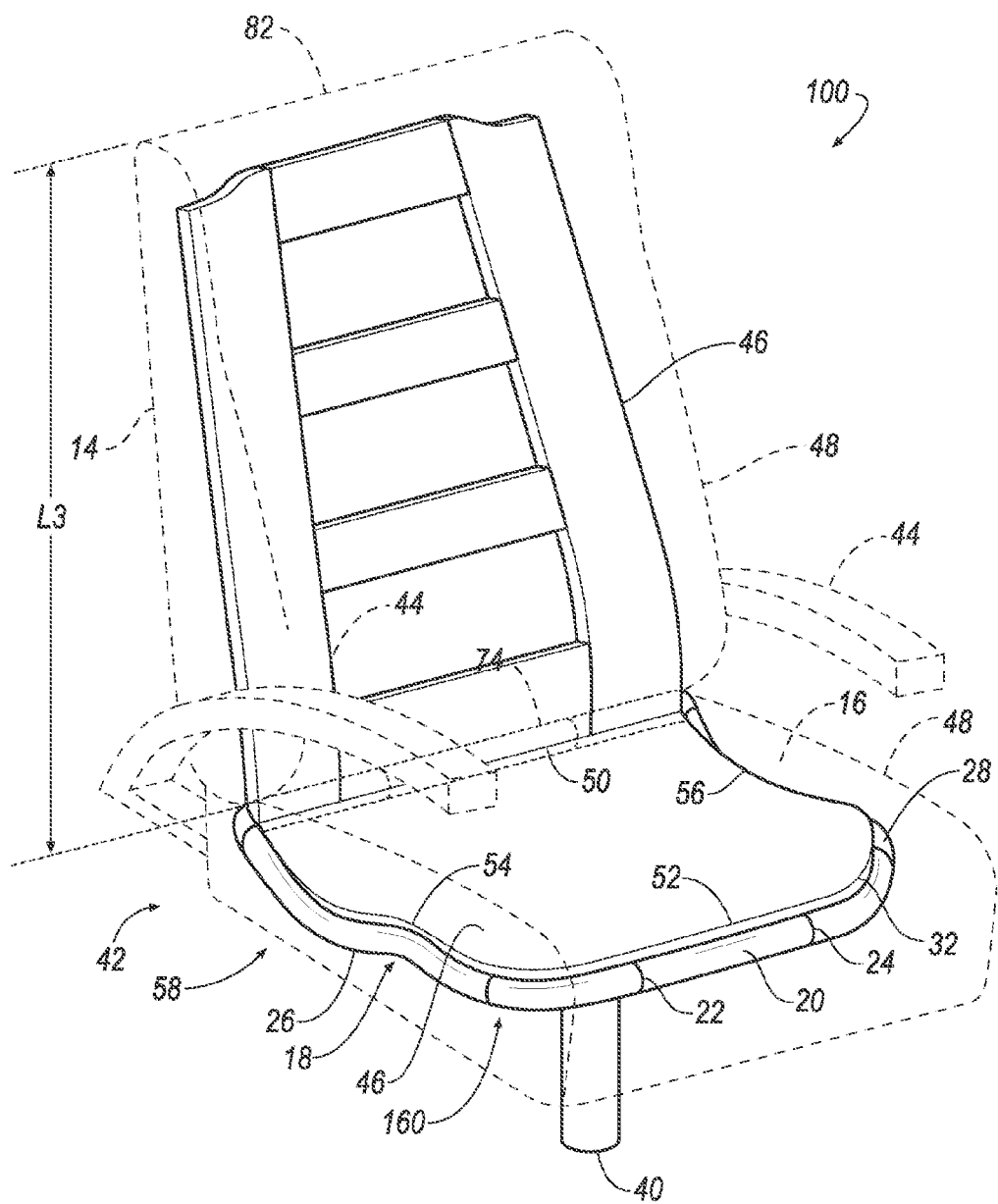
FIG. 6 is a perspective view of the second embodiment of the seat assembly showing the airbag in an uninflated position.
Figure 7:
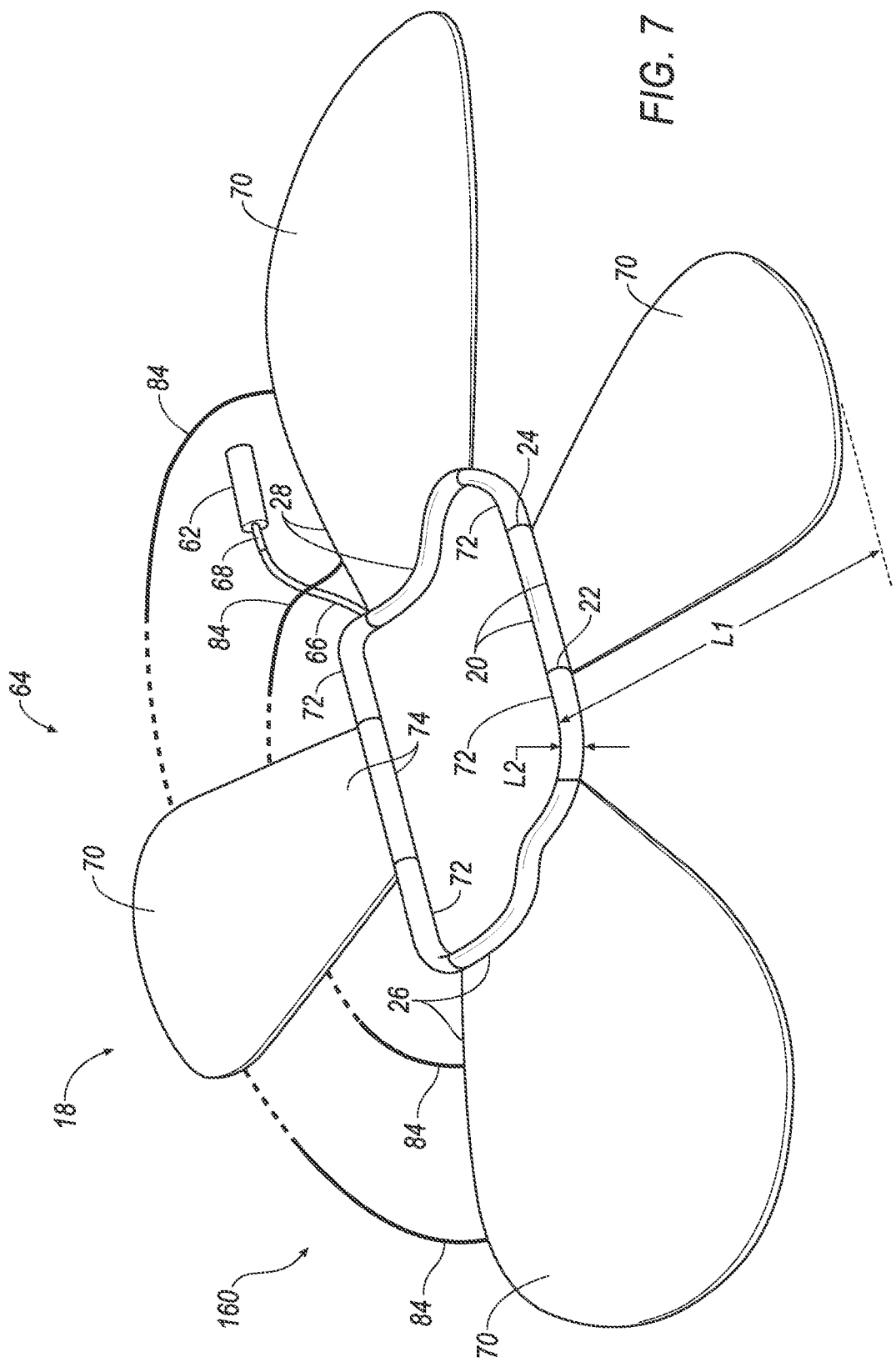
FIG. 7 is a perspective view of an airbag assembly of the second embodiment with the airbag lying flat in the uninflated position.

As set forth further below, a first embodiment of the seat assembly 10 is shown in FIGS. 1-4, and a second embodiment of the seat assembly 100 is shown in FIGS. 5-7. Common numerals are used to identify common features in the various embodiments.

With reference to FIGS. 1, 2 and 5, the vehicle 12 may include more than one seat assembly 10, 100. For example, the vehicle 12 shown in FIGS. 1, 2 and 5 includes four seat assemblies 10, 100. Each of these seat assemblies 10, 100 may be identical, or nearly identical, to each other. The seat assemblies 10, 100 may be located at any suitable position in the vehicle 12.

The vehicle 12 may be, for example, any type of passenger automobile. The vehicle 12, for example, may be an autonomous vehicle. The Society of Automotive Engineers (SAE) has defined multiple levels of autonomous vehicle operation. At levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 requires the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle almost all tasks without any driver intervention. The vehicle 12 may operate in one or more of the levels of autonomous vehicle operation.

With reference to FIGS. 1, 2 and 5, the vehicle 12 includes a body 34 having a floor 36 and defining a passenger cabin 38. The seat assemblies 10, 100 may be mounted to the floor 36 in the passenger cabin 38. As one example, the seat assembly 10, 100 may be rotatably coupled to the floor 36. For example, with reference to FIGS. 3 and 6, the seat assembly 10, 100 includes a mounting post 40 rotatably coupling the seat assembly 10, 100 to the floor 36 of the vehicle 12. As one example, the mounting post 40 is coupled to the seat bottom 16 and extends from the seat bottom 16 to the floor 36 to support the seat assembly 10, 100 on the floor 36. The mounting post 40 may be rotatable relative to the floor 36 and/or relative to the seat assembly 10, 100, e.g., the seat bottom 16. The seat assembly 10, 100 and may be rotatable relative to the floor 36 in any suitable degree of rotation, e.g., 360 degrees. As one example, in configurations where the vehicle 12 is autonomous, during autonomous operation of the vehicle 12, the seat assemblies 10, 100 may be rotated to face each other, as shown in FIGS. 1-2, such that the occupants 30 can face each other and interact.

With reference to FIGS. 1-3 and 5-6, the seat assembly 10, 100 includes a seat 42 having the seat bottom 16 and the seatback 14. The seat 42 may include armrests 44. The armrests 44 may be mounted to the seatback 14 and/or seat bottom 16. Alternatively or in addition, the armrests 44 may be mounted to the mounting post 40 of the seat assembly 10, 100. The armrests 44 may be mounted to the seatback 14, seat bottom 16, and/or mounting post 40 in any suitable fashion, e.g., fasteners, bolts, etc.

The seatback 14 and the seat bottom 16 may each include a frame 46 and a covering 48. The frame 46, for example, may be formed of metal (such as steel, aluminum, etc.), fiber-reinforced composite materials, etc. The covering 48 may include fabric, foam, etc., for providing an aesthetic appearance and cushion for the occupant 30.

As shown in FIGS. 1-3 and 5-6, the seatback 14 extends from the seat bottom 16 in a direction away from the floor 36, i.e., upwardly. The seatback 14 may be pivotally coupled to the seat bottom 16, e.g., the frame 46 of the seatback 14 may be pivotally coupled to the seat bottom 16, allowing the seatback 14 to rotate, i.e., recline, relative to the seat bottom 16. The seatback 14 is pivotally coupled to the seat bottom 16 with any suitable mechanism, hinge, motorized gears, etc.

The seat bottom 16 extends transversely away from the seatback 14. For example, the seat bottom 16 may extend generally parallel to the floor 36. The seat bottom 16 includes a periphery 32 and includes a rear end 50, a front end 52, a first side end 54, and a second side end 56 each on the periphery 32. The seat bottom 16 terminates at the rear end 50, the front end 52, the first side end 54, and the second side end 56. Each of the rear end 50, the front end 52, the first side end 54, and the second side end 56 end are disposed in a common plane, e.g., a generally horizontal plane when in the vehicle 12.

Figure 3:
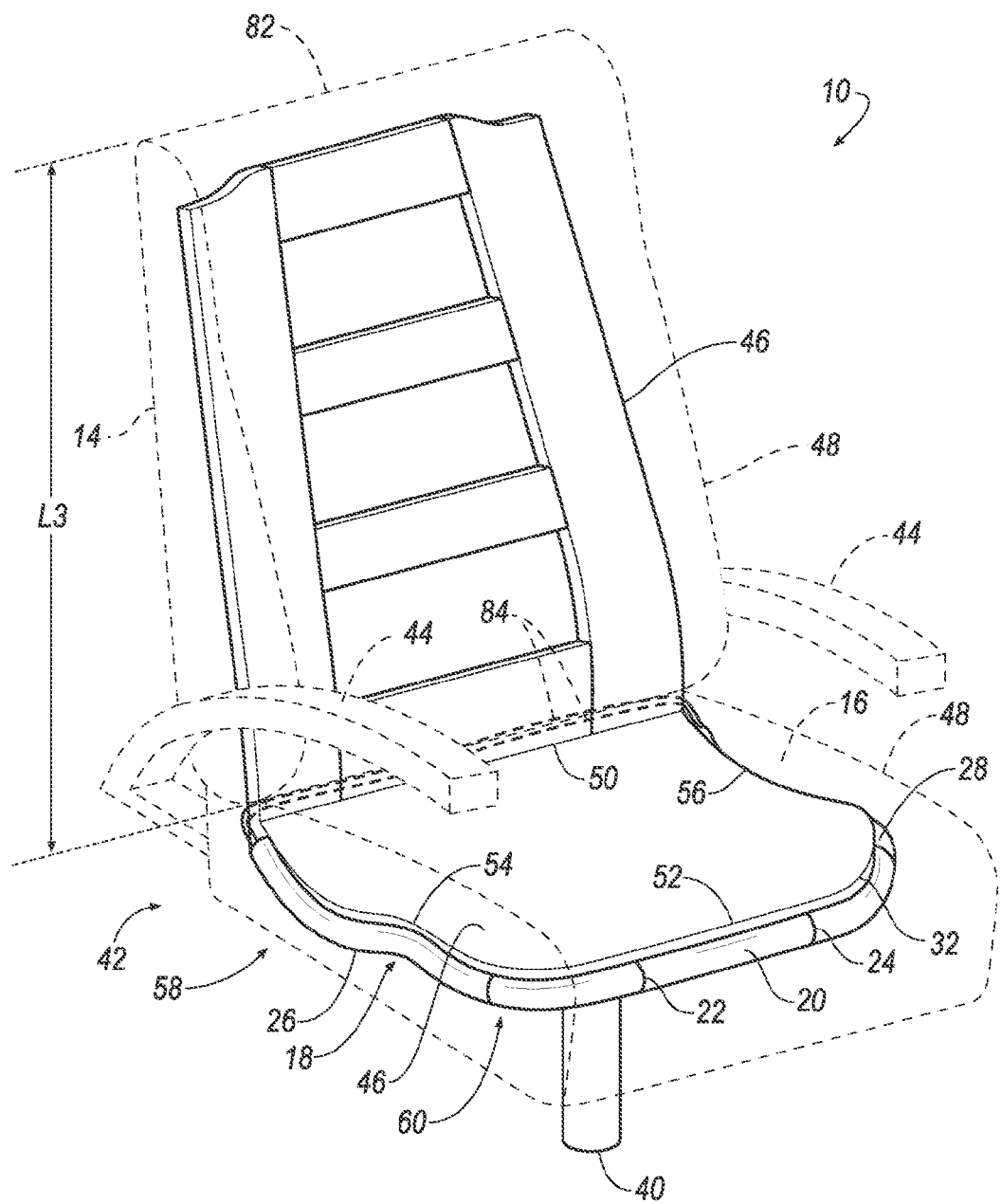
FIG. 3 is a perspective view of the first embodiment of the seat assembly showing the airbag in the uninflated position and tethers in hidden lines.

The rear end 50 is adjacent the seatback 14, e.g., abutting the seatback 14, and the front end 52 is spaced from the rear end 50, i.e., spaced from the seatback 14. The first side end 54 and the second side end 56 are spaced from each other and each extend from the front end 52 to the rear end 50, i.e., to the seatback 14. As shown in FIGS. 3 and 6, for example, the seat bottom 16 has a rectangular shape with the front end 52 parallel to the rear end 50, i.e., to the seatback 14, and with the first side end 54 parallel to the second side end 56. As other examples, the seat bottom 16 may have any suitable shape, e.g., square, trapezoidal, etc.

The seat bottom 16 may include a bottom 58 extending between the front end 52 and the rear end 50, and between the first side end 54 and the second side end 56. The bottom 58 faces the floor 36 of the vehicle 12.

The seat bottom 16 may include one or more chutes (not shown) to direct the airbag 18 upwardly, as shown in FIGS. 2 and 5, as the airbag 18 inflates from the uninflated position to the inflated position. The chutes may be mounted, for example, to the frame 46 of the seat bottom 16 and may extend upwardly from the frame 46.

Figure 4:
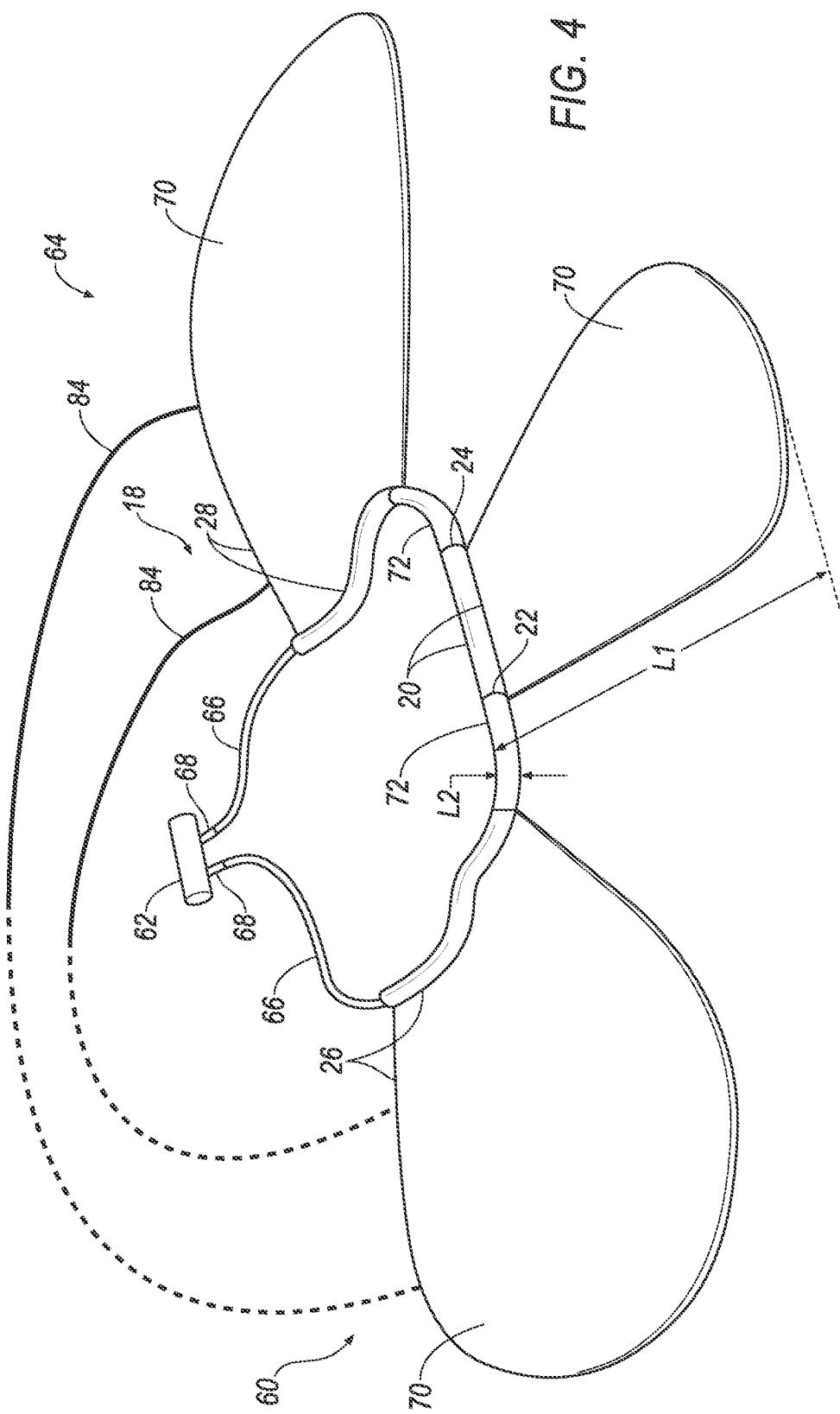
FIG. 4 is a perspective view of an airbag assembly of the first embodiment with the airbag lying flat in the uninflated position.

With reference to FIGS. 4 and 7, the seat assembly 10, 100 includes an airbag assembly 60, 160. The airbag assembly 60, 160 includes the airbag 18 and an inflator 62 in communication with the airbag 18. Specifically, the airbag 18 defines an inflation duct (not shown), and the inflator 62 is in fluid communication with the inflation duct. The airbag 18 is inflatable from the uninflated position, as shown in FIG. 1, to the inflated position, as shown in FIGS. 2 and 5. As set forth further below, the airbag assembly 60, 160 is mounted to the seat bottom 16, and the airbag assembly 60, 160 is shown in FIGS. 4 and 7 with the airbag 18 in the uninflated position prior to installation to the seat bottom 16.

The airbag assembly 60, 160 may be a component of an airbag system 64 including an impact detection system (not shown). For example, the impact detection system may include impact sensors that sense an impact of the vehicle 12. The impact detection system includes a controller, e.g., a computer, that, based on a signal from the impact sensors indicating a sensed impact, may send a signal to the inflator 62 to trigger inflation of the airbag 18 in response to a sensed impact. The impact detection system may sense the type of impact, e.g., based on direction, magnitude, etc., and may trigger inflation of the airbag assembly 60, 160 in response to the type of impact.

The airbag assembly 60, 160 is supported by the seat 42. Specifically, as set forth above, the airbag 18 is supported by the seat bottom 16. The frame 46 of the seat bottom 16 may include attachment features, e.g., holes, clips, hooks, etc., that attach to the airbag 18. The airbag 18 may include tabs (not shown) engaged with the attachment features of the frame 46 of the seat bottom 16, e.g., by fasteners, clips, hooks, etc.

The airbag assembly 60, 160 may be disposed between the frame 46 of the seat bottom 16 and the covering 48. In this example, the covering 48 on the seat bottom 16 may include tear seams (not shown) to allow the airbag 18 to extend therethrough when the airbag 18 is inflated to the inflated position. As another example, the airbag assembly 60, 160 may be disposed external to the covering 48. As set forth further below, the airbag assembly 60, 160 may be disposed on the periphery 32 of the seat bottom 16 and/or on the bottom 58 of the seat bottom 16.

The airbag 18 in the uninflated position may have an elongated-tubular shape. For example, the airbag 18 may be rolled or folded, e.g., Z-fold, accordion fold, etc. The airbag assembly 60, 160 may include a cover (not shown) on the airbag 18 that houses the airbag 18 when the airbag 18 is in the uninflated position. The cover may include a tear seam to allow the airbag 18 to inflate to the inflated position. The cover may be formed of any suitable material such as, for example, nylon, polyester, etc.

The inflator 62 may be mounted to the seat 42, e.g., the seatback 14, the seat bottom 16, and/or the armrest 44. As another example, the inflator 62 may be positioned in any suitable location in the vehicle 12. The airbag assembly 60, 160 may include more than one inflator 62. As an example, the airbag assemblies 60, 160 in FIGS. 4 and 7 include one inflator 62.

With reference to FIGS. 4 and 7, the inflator 62 may be spaced from the airbag 18. For example, the airbag assembly 60, 160 may include a fill tube 66 extending from the inflator 62 to the airbag 18. The airbag assembly 60, 160 may include one or more fill tubes 66, e.g., two fill tubes 66 are shown in the FIG. 4, and one fill tube 66 is shown in FIG. 7. Specifically, the inflator 62 may have one or more ports 68 in communication with the airbag 18 through the fill tube 66, e.g., two ports 68 are shown in the FIG. 4, and one port 68 is shown in FIG. 7. The fill tube 66 may be formed of any suitable high strength flexible material. For example, the fill tube 66 may be nitrile rubber, nylon, thermoplastic elastomer (TPE), etc.

Upon receiving a signal, e.g., from the impact detection system, the inflator 62 may inflate the airbag 18 of the airbag assembly 60, 160 with an inflation medium, such as a gas. The inflator 62 may be, for example, a cold-gas inflator that, when activated, ignites a pyrotechnic charge that creates an opening for releasing the pressurized inflation medium to the airbag 18 via a fill tube 66. Alternatively, the inflator 62 may be of any suitable type, for example, a hybrid inflator.

With reference to FIGS. 4 and 7, the airbag 18 includes expandable portions 70 and restricted ducts 72 disposed between the expandable portions 70. For example, in the first embodiment of the airbag assembly 60 in FIG. 4, the expandable portions 70 include the middle member 20, the first side member 26, and the second side member 28. In the second embodiment of the airbag assembly 160 in FIG. 7, the expandable portions 70 include the middle member 20, the first side member 26, the second side member 28, and a rear member 74.

The restricted ducts 72 are positioned adjacent to legs 76 of an occupant 30 when the occupant 30 is seated on the seat bottom 16, as shown in FIGS. 1, 2, and 5. For example, when an impact of the vehicle 12 is sensed, the airbag 18 may be inflated to the inflated position surrounding the occupant 30 while the restricted ducts 72 of the airbag 18 provide slots 78 for the legs 76 of the occupant 30, as shown in FIGS. 2 and 5. In the inflated position, the expandable portions 70 may absorb energy from the occupant 30 regardless of the seat assembly 10, 100 position or the direction of impact. In addition, the airbag 18 in the inflated position may reduce the likelihood of occupants 30 impacting each other during the impact of the vehicle 12.

The expandable portions 70 may be rolled, folded, etc., in the uninflated position and may expand when inflated by inflation medium from the inflator 62 in the inflated position. The inflation duct of the airbag 18 extends through each of the expandable portions 70 and the restricted ducts 72. In other words, the expandable portions 70 and the restricted ducts 72 are each in fluid communication with each other through the inflation duct. The expandable portions 70 and restricted ducts 72 may be connected in any suitable manner, e.g., stitching, adhesive, ultrasonic welding, etc. One or more of the restricted ducts 72 may be bent, e.g., at a right angle as shown in FIGS. 4 and 7, to position the adjacent expandable portions 70.

In the inflated position, the expandable portions 70 may extend upwardly to be adjacent a head 80 of the occupant 30, e.g., a $50^{th}$ percentile or $95^{th}$ percentile male occupant. The seatback 14 terminates at a top end 82 spaced from the seat bottom 16, and has a length L3 defined from the seat bottom 16 to the top end 82, as shown in FIGS. 2-3 and 5-6. The expandable portions 70 each have a length L1 in an upward direction in the inflated position. The length L1 of the expandable portions 70 in the inflated position is greater than half the length L3 of the seatback 14 so that the expandable portions 70 are adjacent the head 80 of the occupant 30. For example, the length L1 of the expandable portions 70 may be 50%-100% of the length L3.

The restricted ducts 72 are less expandable than the expandable portions 70 when the inflation duct is inflated with inflation medium from the inflator 62. For example, as shown in FIGS. 4 and 7, each expandable portion 70 has the length L1 and each of the restricted ducts 72 has a length L2 less than the length L1. The lengths L1, L2 are identified in FIGS. 4 and 7 for illustrative purposes, and it should be appreciated that, in the inflated position, the lengths L1 and L2 extend upwardly, i.e., in a generally vertical direction.

The restricted ducts 72 may be sized, shaped, formed of a material, and/or constrained such that the restricted ducts 72 expand less than the expandable portions 70. As one example, the restricted ducts 72 may be formed, i.e., stitched, sewn, etc., such that the cross-section of the inflation duct of the restricted ducts 72 is smaller than the cross-section of the expandable portions 70. For example, the restricted ducts 72 may be formed as tubes having a smaller cross-sectional shape and size than the expandable portions 70. In this example, the restricted ducts 72 may be formed separately from and subsequently connected to the expandable portions 70, e.g., by stitching, or may be formed integrally with the expandable portions 70, i.e., formed together simultaneously as a single continuous unit. For example, the restricted ducts 72 and the expandable portions 70 may be formed integrally with one-piece woven methods.

In addition, or in the alternative, the expansion of the restricted ducts 72 in the inflated position may be constrained, for example, by external or internal restraints (not shown). The external or internal restraints may be tethers, rings, stitching, etc.

The airbag 18, e.g., the expandable portions 70 and the restricted ducts 72, may be formed of any suitable type of material, e.g., from a woven polymer. For example, the airbag 18 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane. The expandable portions 70 and the restricted ducts 72 may be formed of the same type of material, or may be formed of different types of materials.

As set forth above, the first embodiment of the seat assembly 10 is shown in FIGS. 1-4. The airbag 18 of the first embodiment 10 includes the middle member 20, the first side member 26, the second side member 28, and two restricted ducts 72. The restricted ducts 72 are spaced from each other, and the middle member 20 extends between the restricted ducts 72. The first side member 26 extends transversely relative to the middle member 20 from one of the restricted ducts 72 toward the seatback 14. The second side member 28 extends transversely relative to the middle member 20 from the other restricted duct 72 toward the seatback 14. The airbag 18, i.e., the middle member 20, first side member 26, the second side member 28, and the restricted ducts 72, may form a U-shape, as shown in FIGS. 3-4.

With reference to FIG. 3, the middle member 20 is adjacent the front end 52 of the seat bottom 16. The restricted ducts 72 may be adjacent the front end 52 of the seat bottom 16, as shown in FIG. 3, or may be disposed on the first side end 54 and the second side end 56, respectively, of the seat bottom 16. Alternatively, one of the restricted ducts 72 may be adjacent to both the front end 52 and the first side end 54, and the other restricted duct 72 may be adjacent to both the front end 52 and the second side end 56, respectively, on the seat bottom 16. The first side member 26 is adjacent the first side end 54 of the seat bottom 16, and the second side member 28 is adjacent the second side end 56 of the seat bottom 16.

The first embodiment of the airbag assembly 60 may include a tether 84 extending from the first side member 26 of the airbag 18 to the second side member 28 of the airbag 18, as shown in FIGS. 1-4. For example, the airbag assembly 60 may include two tethers 84 extending from the first side member 26 to the second side member 28, as shown in FIG.

2. Each tether 84 positions the first side member 26 and the second side member 28 to be adjacent the occupant 30 as the airbag 18 inflates to the inflated position, as shown in FIG. 2, and maintains the distance between the first side member 26 and the second side member 28 in the event that the occupant 30 impacts one of the first side member 26 and the second side member 28.

With reference to FIGS. 2-3, the seatback 14 may be disposed between the tether 84 and the seat bottom 16. In other words, the tether 84 extends around the seatback 14 from the first side member 26 to the second side member 28.

The tether 84 may be slidable along the seatback 14 as the airbag 18 moves from the uninflated position, as shown in FIGS. 1 and 3, to the inflated position, as shown in FIG. 2. The covering 48 on the seatback 14 may include a back tear seam (not shown) through which the tether 84 may extend as the first side member 26 and the second side member 28 inflate to the inflated position.

The inflation operation of the first embodiment of the airbag assembly 60 begins when the impact detection system senses an impact and the controller activates the inflator 62 in response to a sense impact. The inflator 62 inflates the airbag 18 with the inflation medium, and the airbag 18 begins to inflate from the uninflated position. The airbag 18 may tear through the tear seams of the covering 48. While the airbag 18 is inflating, the tethers 84 may tear through the back tear seams of the seatback 14 and slide along the seatback 14 as the airbag 18 is moving to the inflated position. As shown in FIG. 2, for example, the expandable portions 70 of the airbag 18 extend upwardly to the inflated position surrounding the occupants 30 while the restricted ducts 72 provide slots 78 for the legs 76 of the occupants 30. In the inflated position, the expandable portions 70 provide cushioning that absorbs energy as the occupants 30 move in any direction. If the occupants 30 are facing each other, e.g., as shown in FIG. 2, two expandable portions 70, i.e., middle members 20, are between the occupants 30, which provides additional cushioning for energy absorption during, e.g., a frontal collision. In addition, the expandable portions 70 between adjacent seat assemblies 10 in the inflated position provide reaction surfaces for each other in order to provide cushioning for adjacent occupants 30 during, e.g., a side collision.

As set forth above, the second embodiment of the seat assembly 100 is shown in FIGS. 5-7. In addition to the middle member 20, the first side member 26, the second side member 28, the airbag 18 of the second embodiment of the airbag assembly 160 also includes a rear member 74, i.e., a fourth member 74, and four restricted ducts 72. As shown in FIG. 5, in the inflated position, the rear member 74 extends upwardly behind the seatback 14. In other words, the seatback 14 is disposed between the occupant 30 and the rear member 74 in the inflated position. The rear member 74 may provide additional support and energy absorption for other occupants and/or may act as a reaction surface for the airbag 18 of adjacent seat assemblies 10.

With reference to FIGS. 6 and 7, one restricted duct 72 is connected between the rear member 74 and the first side member 26, another duct 72 is connected between the rear member 74 and the second side member 28, another duct 72 connected between the middle member 20 and the first side member 26, and another duct 72 connected between the middle member 20 and the second side member 28.

The rear member 74 extends transversely relative to the first side member 26 and the second side member 28. The airbag 18, i.e., the middle member 20, the first side member 26, the second side member 28, the rear member 74, and the restricted ducts 72, may form a generally rectangular-shape, as shown in FIGS. 6 and 7.

With continued reference to FIGS. 6 and 7, the rear member 74 is adjacent the rear end 50 of the seat bottom 16. The restricted ducts 72 connected to the rear member 74 may be adjacent the rear end 50 of the seat bottom 16, as shown in FIG. 6, or may be disposed on the first side end 54 and the second side end 56, respectively, of the seat bottom 16. Alternatively, one of the restricted ducts 72 connected to the rear member 74 may be adjacent to both the rear end 50 and the first side end 54, and the other restricted duct 72 connected to the rear member 74 may be adjacent to both the rear end 50 and the second side end 56, respectively, on the seat bottom 16.

The second embodiment of the airbag assembly 160 may include a tether 84 extending from the rear member 74 to the first side member 26, and a tether 84 extending from the rear member 74 to the second side member 28, as shown in FIG. 5. For example, the airbag assembly 160 may include two tethers 84 extending from the rear member 74 to the first side member 26, and two tethers 84 extending from the rear member 74 to the second side member 28, as shown in FIG. 5. Each tether 84 positions the first side member 26 and the second side member 28 to be adjacent the occupant 30 as the airbag 18 inflates to the inflated position, as shown in FIG. 5, and maintains the distance between the first side member 26 and the second side member 28 in the event that an occupant 30 impacts one of the first side member 26 and the second side member 28.

The tethers 84 may be slidable along the seatback 14 as the airbag 18 moves from the uninflated position to the inflated position. The covering 48 on the seatback 14 may include a tear seam (not shown) through which the tethers 84 and the rear member 74 may extend as the rear member 74, the first side member 26, and the second side member 28 inflate to the inflated position.

The inflation operation of the second embodiment of the airbag assembly 160 begins when the impact detection system senses an impact and the controller activates the inflator 62 in response to a sense impact. The inflator 62 inflates the airbag 18 with the inflation medium, and the airbag 18 begins to inflate from the uninflated position. The airbag 18, specifically the middle member 20, the first side member 26, and the second side member 28, may tear through the tear seams of the covering 48. At the same time, the rear member 74 and the tethers 84 may tear through the tear seams of the seatback 14. The tethers 84 may slide along the seatback 14 as the airbag 18, i.e., the middle member 20, the rear member 74, the first side member 26, and the second side member 28, moves to the inflated position. As shown in FIG. 5, for example, the expandable portions 70 of the airbag 18 extend upwardly to the inflated position surrounding the occupants 30 while the restricted ducts 72 provide slots 78 for the legs 76 of the occupants 30. In the inflated position, the expandable portions 70 provide cushioning that absorbs energy as the occupants 30 move, for example, forward, and/or away from a longitudinal axis of the vehicle 12 during, e.g., a frontal oblique collision. If the occupants 30 are facing in the same direction, e.g., as shown in FIG. 5, two expandable portions 70, i.e., the middle member 20 and the rear member 74, are between the occupants 30, which provides additional cushioning for energy absorption during, e.g., a frontal collision. In addition, the expandable portions 70 between adjacent seat assemblies 100 in the inflated position provide reaction surfaces for each other in order to provide cushioning for adjacent occupants 30 during, e.g., a side collision.

The tethers 84 of the first and second embodiments of the airbag assembly 60, 160 may be formed of any suitable type of material. As one example, the tethers 84 may be formed of the same type of material as the first side member 26 and the second side member 28. As another example, the tethers 84 may be formed of an elastic material, i.e., the tethers 84 will return to its initial shape and size after being stretched. The elastic material may be, for example, natural rubber, synthetic rubber, polyester-rubber mixture, etc. The tethers 84 may be attached to the airbag 18 by, for example, adhesion, stitching, ultrasonic welding, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat assembly comprising:
a seatback;
a seat bottom extending away from the seatback; and
an airbag supported by the seat bottom;
the airbag including a middle member spaced from the seatback and having a first end and a second end; and
the airbag including a first side member extending from the first end toward the seatback and a second side member extending from the second end toward the seatback;
wherein the middle member, the first side member, and the second side member, in uninflated positions, are collectively an elongated-tubular shape.

2. The seat assembly set forth in claim 1, wherein the seat bottom includes a front end spaced from the seatback, and a first side end and a second side end each extending from the front end to the seatback, wherein the middle member is adjacent the front end.

3. The seat assembly set forth in claim 2, wherein the first side member is adjacent the first side end, and the second side member is adjacent the second side end.

4. The seat assembly set forth in claim 1, wherein the airbag is inflatable from an uninflated position to an inflated position and includes two restricted ducts, the restricted ducts being less expandable than the middle member as the airbag inflates from the uninflated position to the inflated position.

5. The seat assembly set forth in claim 4, wherein one restricted duct is connected between the middle member and first side member, and the other restricted duct is connected between the middle member and the second side member.

6. The seat assembly set forth in claim 5, wherein the seat bottom includes a front end spaced from the seatback, and a first side end and a second side end each extending from the front end to the seatback, wherein the middle member and the restricted ducts are adjacent the front end.

7. The seat assembly set forth in claim 1, wherein the airbag includes a tether extending from the first side member to the second side member, the seatback being disposed between the seat bottom and the tether.

8. The seat assembly set forth in claim 7, wherein the airbag is inflatable from an uninflated position to an inflated position, the tether being slidable along the seatback as the airbag moves from the uninflated position to the inflated position.

9. The seat assembly set forth in claim 1, wherein the airbag includes a rear member extending between the first side member and the second side member.

10. The seat assembly set forth in claim 9, wherein the rear member is adjacent the seatback.

11. The seat assembly set forth in claim 9, further comprising a tether extending from the rear member to the first side member, and a tether extending from the rear member to the second side member.

12. The seat assembly set forth in claim 9, wherein the airbag is inflatable from an uninflated position to an inflated position and includes four restricted ducts, the restricted ducts being less expandable than the rear member as the airbag inflates from the uninflated position to the inflated position.

13. The seat assembly set forth in claim 12, wherein one restricted duct is connected between the rear member and the first side member, another duct connected between the rear member and the second side member, another duct connected between the middle member and the first side member, and another duct connected between the middle member and the second side member.

14. The seat assembly as set forth in claim 1, wherein the seatback includes a top end spaced from the seat bottom, the seatback having a length from the seat bottom to the top end, wherein the airbag is inflatable from an uninflated position to an inflated position, the middle member, the first side member and the second side member all having a length in the inflated position greater than half the length of the seatback.

15. An airbag assembly comprising:
an airbag including a middle member and two restricted ducts, the middle member extending between the restricted ducts;
the airbag including a first side member extending from one of the restricted ducts, and a second side member extending from the other restricted duct; and
the airbag being inflatable from an uninflated position to an inflated position, wherein the restricted ducts are less expandable than the middle member as the airbag inflates from the uninflated position to the inflated position;
wherein the middle member, the first side member, and the second side member, in uninflated positions, and the restricted ducts form a U-shape.

16. The airbag assembly as set forth in claim 15, wherein the middle member extends along a first direction in the inflated position, and either of the restricted ducts extend along a second direction in the inflated position, wherein a length of the middle member along the first direction in the inflated position is greater than a length of either of the restricted ducts along the second direction in the inflated position.

17. The airbag assembly as set forth in claim 15, wherein the airbag includes a fourth member extending between the first side member and the second side member.

18. The airbag assembly as set forth in claim 15, wherein the first side member and the second side member extend transversely from the middle member.

19. A seat assembly comprising:
a seatback;
a seat bottom extending away from the seatback; and
an airbag supported by the seat bottom;
the airbag including a middle member spaced from the seatback and having a first end and a second end; and
the airbag including a first side member extending from the first end toward the seatback, a second side member extending from the second end toward the seatback, and a tether extending from the first side member to the second side member, the seatback being disposed between the seat bottom and the tether.

20. The seat assembly set forth in claim 19, wherein the airbag is inflatable from an uninflated position to an inflated position, the tether being slidable along the seatback as the airbag moves from the uninflated position to the inflated position.

\* \* \* \* \*